(12) United States Patent
Abdou et al.

(10) Patent No.: US 7,097,931 B2
(45) Date of Patent: Aug. 29, 2006

(54) FLUID FLOW-FIELDS FOR ELECTROCHEMICAL DEVICES

(75) Inventors: Mohamed Abdou, Kingston (CA); Peter Andrin, Napanee (CA); Mukesh K. Bisaria, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 360 days.

(21) Appl. No.: 10/250,563

(22) PCT Filed: Feb. 27, 2002

(86) PCT No.: PCT/US02/07823

§ 371 (c)(1),
(2), (4) Date: Jun. 30, 2003

(87) PCT Pub. No.: WO02/069426

PCT Pub. Date: Sep. 6, 2002

(65) Prior Publication Data

US 2004/0058219 A1    Mar. 25, 2004

(51) Int. Cl.
*H01M 2/14* (2006.01)
(52) U.S. Cl. ..................................... 429/39
(58) Field of Classification Search .............. 429/34, 429/38, 32, 39
See application file for complete search history.

(56) References Cited

U.S. PATENT DOCUMENTS

| 4,769,297 A | 9/1988 | Reiser et al. ............... 429/17 |
| 4,808,492 A | 2/1989 | Uozumi et al. .............. 429/34 |
| 4,826,742 A | 5/1989 | Reiser ......................... 429/33 |
| 4,988,583 A | 1/1991 | Watkins et al. .............. 429/30 |
| 5,108,849 A | 4/1992 | Watkins et al. .............. 429/30 |
| 5,268,241 A | 12/1993 | Meacham ..................... 429/35 |
| 6,245,453 B1 * | 6/2001 | Iwase et al. .................. 429/34 |
| 2003/0129475 A1 | 7/2003 | Enjoji et al. .................. 429/38 |

FOREIGN PATENT DOCUMENTS

| EP | 0 924 785 | 6/1999 |
| EP | 0 961 333 | 12/1999 |
| JP | 08 222237 | 8/1996 |

OTHER PUBLICATIONS

PCT/US02/07823, International Search Report dated Nov. 12, 2003.

* cited by examiner

*Primary Examiner*—Patrick Joseph Ryan
*Assistant Examiner*—Thomas H. Parsons

(57) ABSTRACT

Disclosed is a novel fluid flow field plate for use in a solid polymer electrolyte fuel cell. The flow field plate is made of a suitable electrically conducting material and comprises a substantially planar surface, a flow field formed in said substantially planar surface, said flow field comprising a plurality of staggered lands defining a network of substantially symmetric interconnected orifices and diagonal channels in the flow field and a fluid supply manifold through which fuel and an oxidant are introduced to the flow field and a fluid exhaust manifold through which reaction by-products and excess fuel and oxidant are removed from the flow field. Streams of the fuel, oxidant and reaction by-products are continually separated and diverted into separate channels, and the separated streams are then mixed with streams from adjacent channels in the orfices.

8 Claims, 4 Drawing Sheets

FLUID FLOW-FIELDS FOR ELECTROCHEMICAL DEVICES

FIELD OF THE INVENTION

This invention relates to new electrochemical fuel cells, and in particular to the design of fluid flow fields for the electrically conductive plates.

TECHNICAL BACKGROUND OF THE INVENTION

A fuel cell is a galvanic cell that generates electrical energy by converting chemical energy, derived from a fuel supplied to the cell, directly into electrical energy by an electrochemical process in which the fuel is oxidized in the cell. A typical fuel cell includes an anode, a cathode, electrocatalysts and an electrolyte housed in a casing. The fuel material and oxidant are continuously and independently supplied to the anodes and cathodes, respectively, where the fuel and oxidant react chemically to generate a useable electric current. The reaction by-products are withdrawn from the cell.

A great advantage of a fuel cell is that it converts chemical energy directly to electrical energy without the necessity of undergoing any intermediate steps, for example, combustion of a hydrocarbon or carbonaceous fuel as takes place in a thermal power station. A fuel cell reactor may comprise a single-cell, or a multi-cell stack. In either case, the membrane/electrode assembly (MEA), comprising the proton-conducting membrane (the electrolyte) and the anode and cathode, is typically sandwiched between two highly (electrically) conductive flow field plates that may serve multiple functions. First, these plates may function as current collectors providing electrical continuity between the fuel cell voltage terminals and electrodes. Additionally, the flow field plates provide mechanical support for the MEA and distribute the reactants and water across the active area of the MEA electrodes, which is accomplished by a flow field imprinted into the side of each plate in direct contact with the electrodes of the MEA. It is well known that the performance of a fuel cell is highly dependent on the efficient transport of reactants to the electrodes, on the uniform humidification of the MEA, and on the appropriate water management of the cell, i.e., the supply and removal of water produced during operation of the cell. Since flow field design controls the reactant concentration gradient, flow rate, pressure drop and water distributions, the flow field design affects the performance of fuel cells.

Tie rods and end plates hold the fuel cell assembly together. Feed manifolds are respectively provided to feed the fuel (such as hydrogen, reformed methanol or natural gas) to the anode and the oxidant (air or oxygen) to the cathode via the fluid flow field plates. Exhaust manifolds are provided to exhaust excess fuel and oxidant gases and water and other by-products formed at the cathode.

Multi-cell structures comprise two or more such fuel cell assemblies connected together in series or in parallel to increase the overall power output of the fuel cell as required. In such arrangements, the cells are typically connected in series, wherein one side of a given plate is the anode plate for one cell, and the other side of the plate is the cathode plate for the adjacent cell and so on.

The flow field is imprinted into the side of each flow field plate in direct contact with the electrodes of the MEA. The flow field provides distribution/flow channels to distribute the reactants across the active area of the MEA electrodes and remove by-product and water.

The performance of the fuel cell is highly dependent on the efficient transport of reactants to the electrodes, on the removal of by-products and water away from the electrodes, and on the appropriate fluid management of the cell. Flow field design affects the performance of an electrochemical fuel cell because flow field design controls the reactant concentration gradient, distribution, flow rate, pressure drop and water/by-product removal.

Recently, several problems have been recognized in the art with respect to flow field design and the reactant flow channel configurations, especially in fuel cells that use liquid fuels such as methanol as reactants. Key problems with these prior art designs include inadequate fuel flow distribution, high pressure-drops across the MEA and poor removal of by-products and water.

Conventional flow field designs typically comprise either pin or serpentine designs. An example of a flow field design of the pin-type is illustrated in U.S. Pat. No. 4,769,297 in which an anode flow field plate and a cathode flow field plate have each projections, which may be referred to as pins. The fuel flows across the anode plate through the intervening grooves formed by the projections, with the oxidant similarly flowing through intervening grooves formed in the cathode flow field plate. Other examples of flow fields having a pin-type design are illustrated in U.S. Pat. No. 4,826,742. Pin-design flow fields result in low reactant pressure drop across the corresponding flow field, however, reactants flowing through such flow fields tend to follow the path of least resistance across the flow field that may result in channeling and the formation of stagnant areas. This in turn results in poor fuel cell performance.

An example of a flow field incorporating a single serpentine design is illustrated in U.S. Pat. No. 4,988,583. As shown in FIG. 2 of U.S. Pat. No. 4,988,583, a single continuous fluid flow channel is formed in a major surface of the flow field plate. A reactant enters through the fluid inlet of the serpentine flow channel and exits through the fluid outlet after traveling over a major part the plate. Such a single serpentine flow field forces the reactant flow to traverse the entire active area of the corresponding electrode, thereby eliminating areas of stagnant flow. However, this channeling of reactant across the active area results in a relatively high reactant flow path length that creates a substantial pressure drop and significant concentration gradients from inlet to outlet. Additionally, the use of a single channel to collect the entire liquid water product from the electrode may promote flooding of the single serpentine, especially at high current densities.

U.S. Pat. No. 4,988,583 also tries to address this pressure drop problem by providing an embodiment in which there are several continuous separate flow channels. The multiple serpentine flow field design is illustrated in FIG. 4 of U.S. Pat. No. 5,108,849.

The flow field designs described have certain drawbacks, especially in fuel cells using methanol as the reactant fuel. In such systems, the by-products are large quantities of carbon dioxide gas and water. The main drawbacks include:
  Unfavorable pressure drop across the flow field. Long, narrow flow paths, as found in the serpentine designs, lead to high pressure drops inside the flow channels. In these cases, high parasitic power is required to pressurize the reactants.
  Stagnant areas within the flow field. The reaction rate of the fuel cell is normally slower in stagnant areas, hence significantly affecting the performance of the fuel cell.

The formation and presence of stagnant areas leads to ineffective utilization of the electrode catalyst. This occurs when the reactants are in the liquid form and the by-products are gases with limited solubility in the liquid reactants under operating conditions. The by-products form gas bubbles that may adsorb on the electrode surface and cover the active catalyst area and/or upset/hinder the flow of reactants in the flow field.

Flooding of the electrode. In cases where the reactants are in the gas phase while the by-products are liquid, poor removal and accumulation of the by-products inside the cell will promote flooding. Flooding reduces the efficiency of the fuel cell since less reactant is exposed to the catalyst in the electrode.

High concentration gradients of reactants across the flow field. Long flow paths may cause significant concentration gradients from the inlet to the outlet of the fuel cell, and lead to non-uniform current distribution through the fuel cell.

These problems and others are addressed by the flow field designs of the present invention.

SUMMARY OF THE INVENTION

The present invention provides fluid flow field designs comprising combinations of diagonal channels and orifices. The diagonal channels provide pathways to distribute the reactant fuel in all directions a flow field and has orifices to optimize the pressure drop in the fuel flow channels between the inlet and outlet manifolds, thereby improving flow distribution and by-product removal.

Accordingly, there is provided a flow field plate for use in a proton exchange membrane fuel cell, said flow field plate being made of a suitable electrically conducting material and comprising:
  (a) a substantially planar surface;
  (b) a flow field formed in the substantially planar surface, the flow field comprising a plurality of staggered lands defining a network of substantially symmetric interconnected orifices and diagonal channels in the flow field;
  (c) a fluid supply manifold through which fuel and an oxidant are introduced to the flow field and a fluid exhaust manifold through which reaction by-products and excess fuel and oxidant are removed from the flow field;

whereby streams of the fuel, oxidant and reaction by-products are continually separated and diverted into separate channels, and the separated streams are then mixed with streams from adjacent channels in the orfices.

In a second embodiment of the present invention, there is provided a fuel cell assembly comprising:
  (a) an anode;
  (b) a cathode;
  (c) a solid polymer electrolyte disposed between the anode and cathode; and
  (d) a pair of opposing flow field plates made of a suitable electrically conducting material and comprising:
    (i) a substantially planar surface;
    (ii) a flow field formed in the substantially planar surface, the flow field comprising a plurality of staggered lands defining a network of substantially symmetric interconnected orifices and diagonal channels in the flow field;
    (iii) a fluid supply manifold through which fuel and an oxidant are introduced to the flow field and a fluid exhaust manifold through which reaction by-products and excess fuel and oxidant are removed from the flow field;

whereby streams of the fuel, oxidant and reaction by-products are continually separated and diverted into separate channels, and the separated streams are then mixed with streams from adjacent channels in the orfices.

BRIEF DESCRIPTION OF THE DRAWINGS

The preferred embodiments of the present invention will be described with reference to the accompanying drawings in which like numerals refer to the same parts in the several views and in which.

DETAILED DESCRIPTION OF THE PREFERRED EMBODIMENTS

A typical fuel cell reactor may comprise a single-cell, or a multi-cell stack. In either case, the membrane/electrode assembly (MEA) comprising the proton-conducting membrane (the electrolyte) and the anode and cathode, is typically sandwiched between two highly (electrically) conductive flow field plates. The cathode and the anode typically comprise a porous backing made of an electrically conductive material, such as carbon paper, cloth or felt, and an electrocatalyst layer bonded to the porous backing. The electrocatalyst layers of each electrode comprise a mix of electrocatalyst particles and proton-conducting particles.

Figure 2:
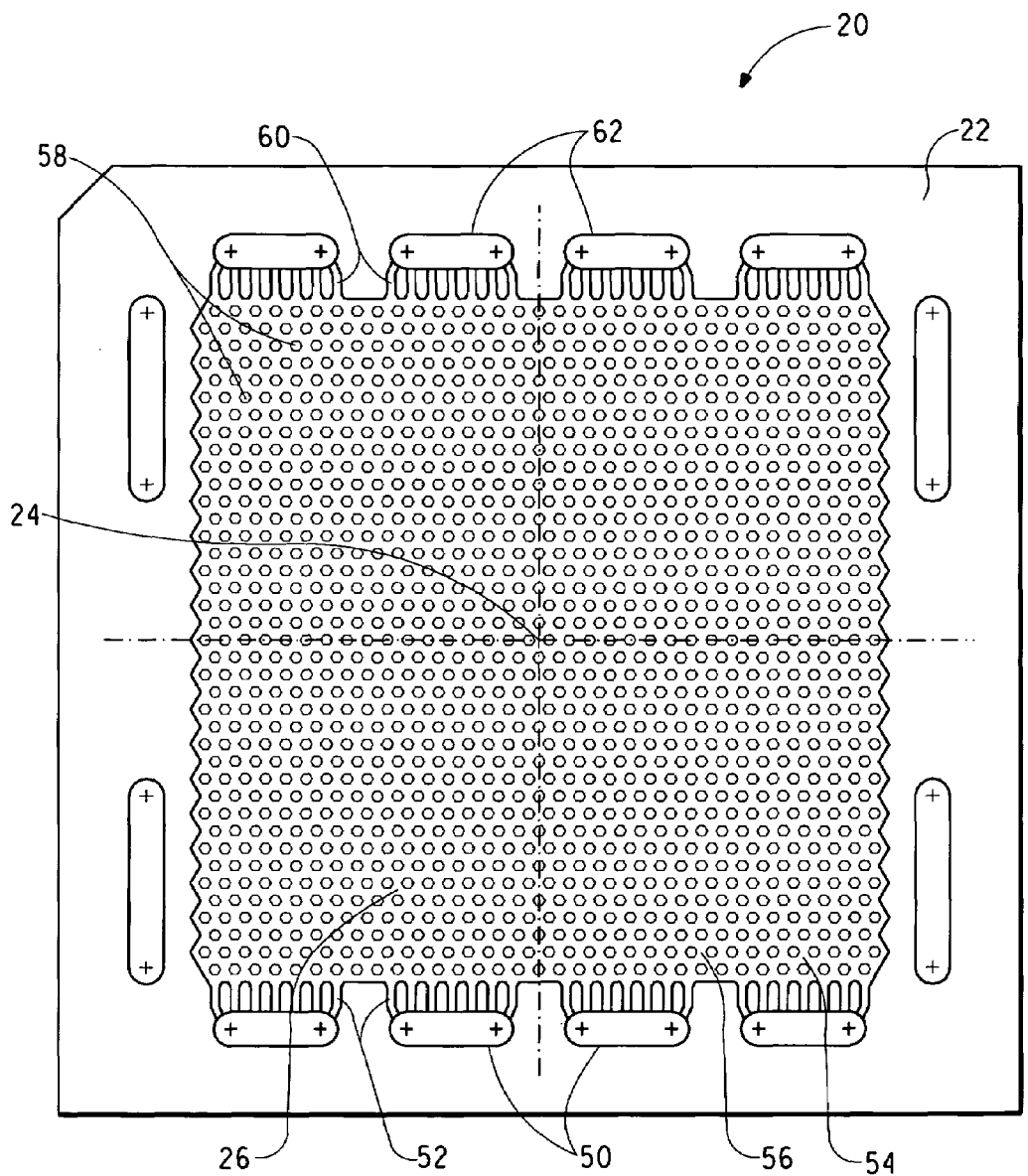
FIG. 2 illustrates a typical flow field of the present invention, namely the honeycomb design.

The flow field plate is made of an electrically conductive material, and is preferably made from non-porous nuclear grade carbon blocks. However, other conventional electrically conductive materials such as electrically-conductive polymers, corrosion resistant metals, and graphite/polymer composites are used to make the flow field plates. As seen in FIG. 2, the plate 20 includes a substantially planar surface 22, having a central portion 24, and a flow field 26 formed in the central portion 24 of the surface 22. In the illustrated embodiments, both the flow field plate 20 and the flow field 26 are shown to have a generally square shape, which is typical of the shape of conventional, industry-standard flow fields and plates. However, it should be understood that the novel features of the flow field plate and included flow field of the present invention are not limited to a particular geometric shape. It should be further understood that the flow field 26 does not have to be centrally located in surface 22 of the plate 20, as shown in FIG. 2, for the present invention.

Figure 1A:
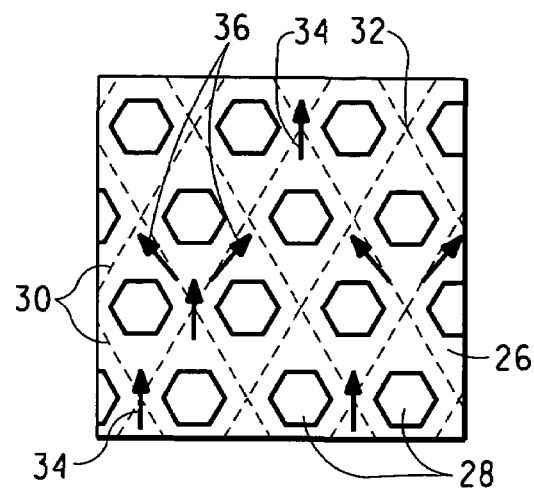
FIG. 1 illustrates two examples of the flow field designs of the present invention.
Figure 1B:
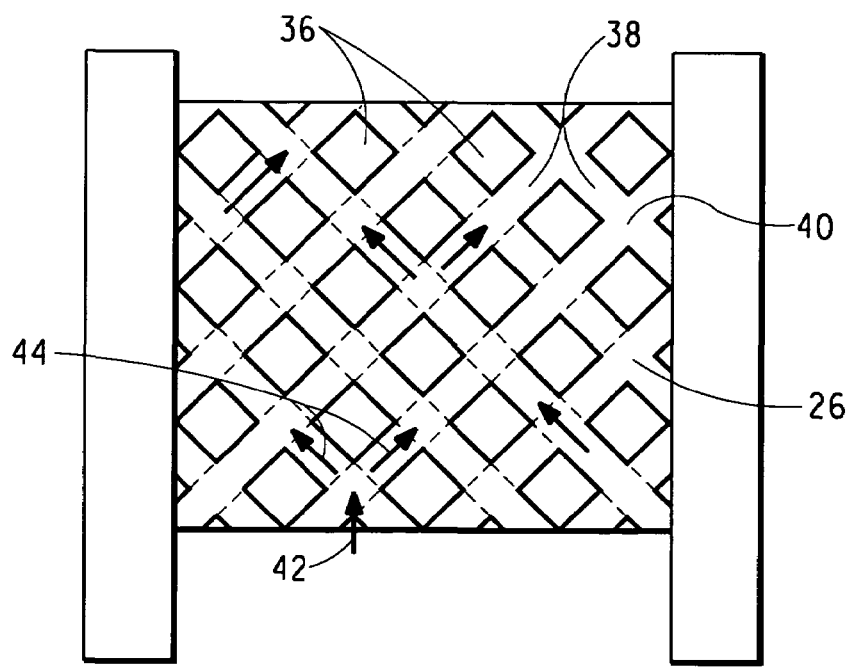

As illustrated in FIGS. 1A, 1B and 2, the present invention involves flow field designs comprising combinations or networks of diagonal channels and orifices. In FIGS. 1A and 1B, a portion of a flow field 26 is illustrated, whereas FIG. 2 illustrates a complete plate 20, and flow field 26.

In FIG. 1A, the flow field 26 comprises a plurality of staggered octagonal shaped lands 28 forming a honeycomb design. The octagonal lands 28 define a series or network of diagonal channels 30 in the flow field 26. The octagonal lands 28 also define a plurality of orifices 32 in fluid connection with the diagonal channels 30. The arrows in FIG. 1A illustrate the flow of fuel, oxidant and by-products in the flow field 26. In this illustrated example, the flow of material is generally from the bottom towards up.

Arrows 34 show a portion of the material flowing in an orifice 32. The material is then separated into approximately two equal streams, as shown by arrows 36, when the material encounters one of the lands 28. Hence, in the design of FIG. 1A, the flow of material is continually divided into two approximately equal streams as the material encounters a land 28.

Moreover, it will also be noted that as the material flows through a channel 30, it enters an orifice 32, where that material is mixed with material flowing in an adjacent channel 30. In other words, with the honeycomb design of FIG. 1A, the material (fuel, oxidant and by-product), is continually separated and diverted into two channels 30 when it encounters a land 28, and then the separated streams are mixed with streams from adjacent channels when the material enters an orifice 32.

In the embodiment shown in FIG. 1B, the flow field 26 comprises a plurality of staggered diamond-shaped lands 36 that define a network on interconnected diagonal channels 38 and orifices 40. In the flow of material in the example of FIG. 1B is also generally from the bottom towards the top. Arrow 42 shows a stream of material encountering a land and being divided into two approximately equal streams 44. The divided streams travel through their respective channels 38 and meet at an orifice 40 where the material is mixed with the material from an adjacent channel. Therefore, in this example, the flow of material is also continually separated and diverted into two channels 38 when it encounters a land 36, and then the separated streams are mixed with streams from adjacent channels when the material enters an orifice 40.

In FIG. 2, a complete plate 20 is illustrated, having subtantially planar surface 22 on which a flow field 26 is located in a central portion 24 of the surface 22. A honeycomb design flow field pattern, similar to that shown in FIG. 1A, is shown in FIG. 2. The plate further comprises a fluid supply manifold from which extend fluid inlet channels 52. The reactants (fuel and oxidant) enter the manifold 50 and the flow of reactants is separated and directed to the plurality of inlet channels 52. From the inlet channels 52, the reactants then enter the network of diagonal channels 54 and orifices 56 defined by the plurality of staggered octagonal lands 58.

As the reactants enter the flow field 26, they begin reacting and generating by-products. The flow of fuel, oxidant and by-products continues accros the flow field 26 generally from the bottom towards the top. At the exit of the flow field 26, there are a plurality of outlet channels 60 in fluid connection with a fluid exhaust manifold 62 through which excess fuel, oxidant and by-products are removed.

The materials, as they move through the flow field 26 from inlet (bottom) to outlet (top), are continuously separated and diverted into two channels 54 when it encounters a land, and then the separated streams are mixed with streams from adjacent channels 54 when the material enters an orifice 56. This continuous separation and remixing is effective in distributing the reactants generally equally over the entire surface of the flow field 26, while also removing by-products therefrom.

In the flow field design of the present invention, the diagonal channels, therefore, provide pathways to distribute the fuel reactants, oxidant and by-products in all directions within the flow field and the orifices to optimize the pressure drop in the fluid flow channels between the inlet and outlet manifolds thereby improving flow distribution and by-product removal.

The diagonal channels also provide pathways for distributing the reactants uniformly on the catalytic surface of the electrode. The average path lengths of the channels are substantially equal, thereby exposing each portion of the flow field to the same flow conditions and pressure drop. The orfices are distinguished by the Venturi effect that creates a push-pull mechanism to improve mixing of the reactants and removal of by-products.

The diagonal channels and orifices are defined in the flow field by a plurality of staggered "lands". Preferably, the staggered lands are octagonal in shape (as shown in FIGS. 1A and 2), however other shapes such as diamond (as shown in FIG. 1B) are contemplated.

In addition, the flow-field design includes a plurality of supply manifolds and flow passages effective in supplying the fuel and the oxidant to the flow-field during operation of the fuel cell and a plurality of exhaust manifolds and flow passages effective for receiving excess fuel and oxidant and by-products discharging from the flow-field.

Figure 3:
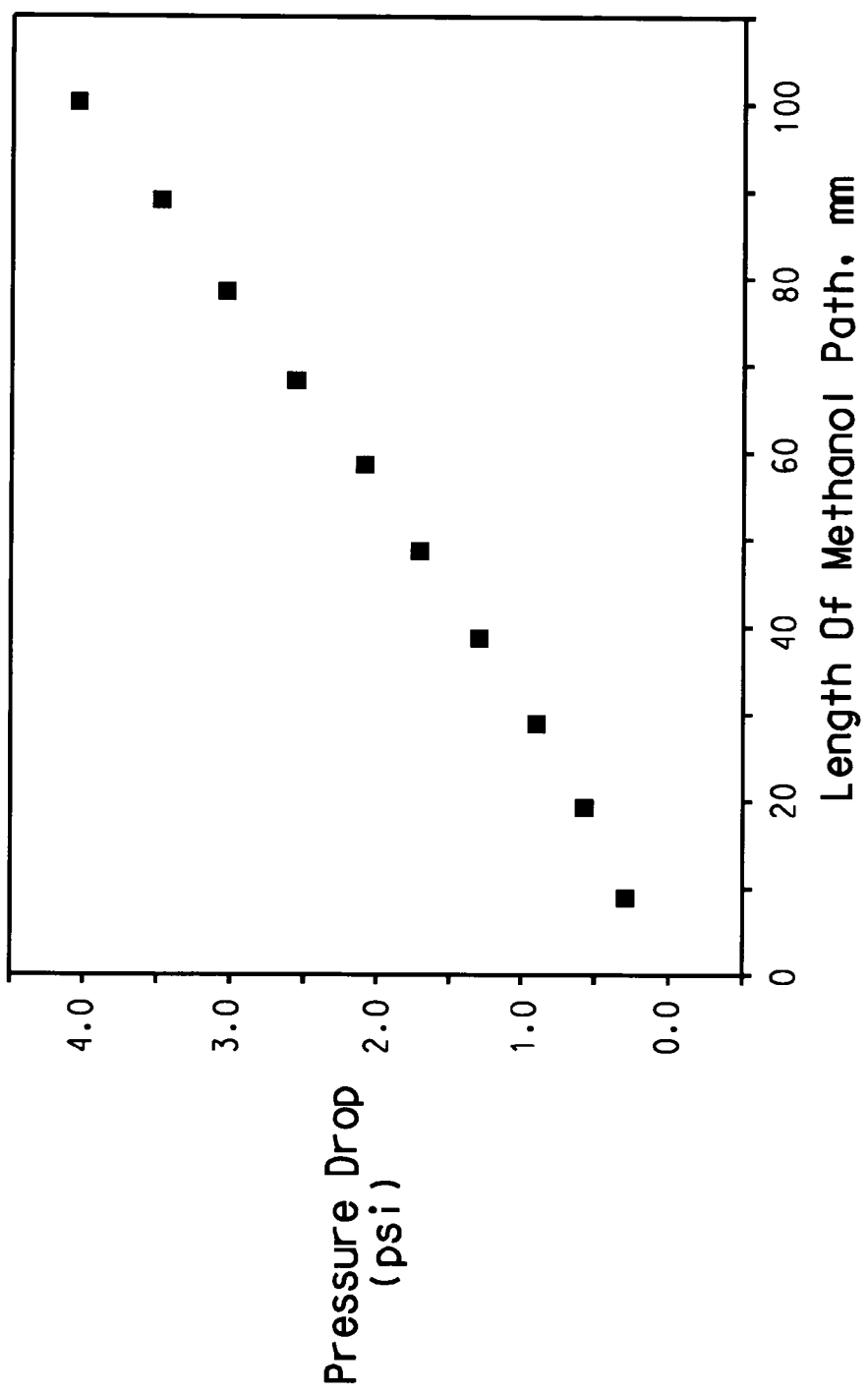
FIG. 3 shows the pressure drop of reactant (liquid methanol and $CO_2$ gas) for the flow field of FIG. 2.
Figure 4:
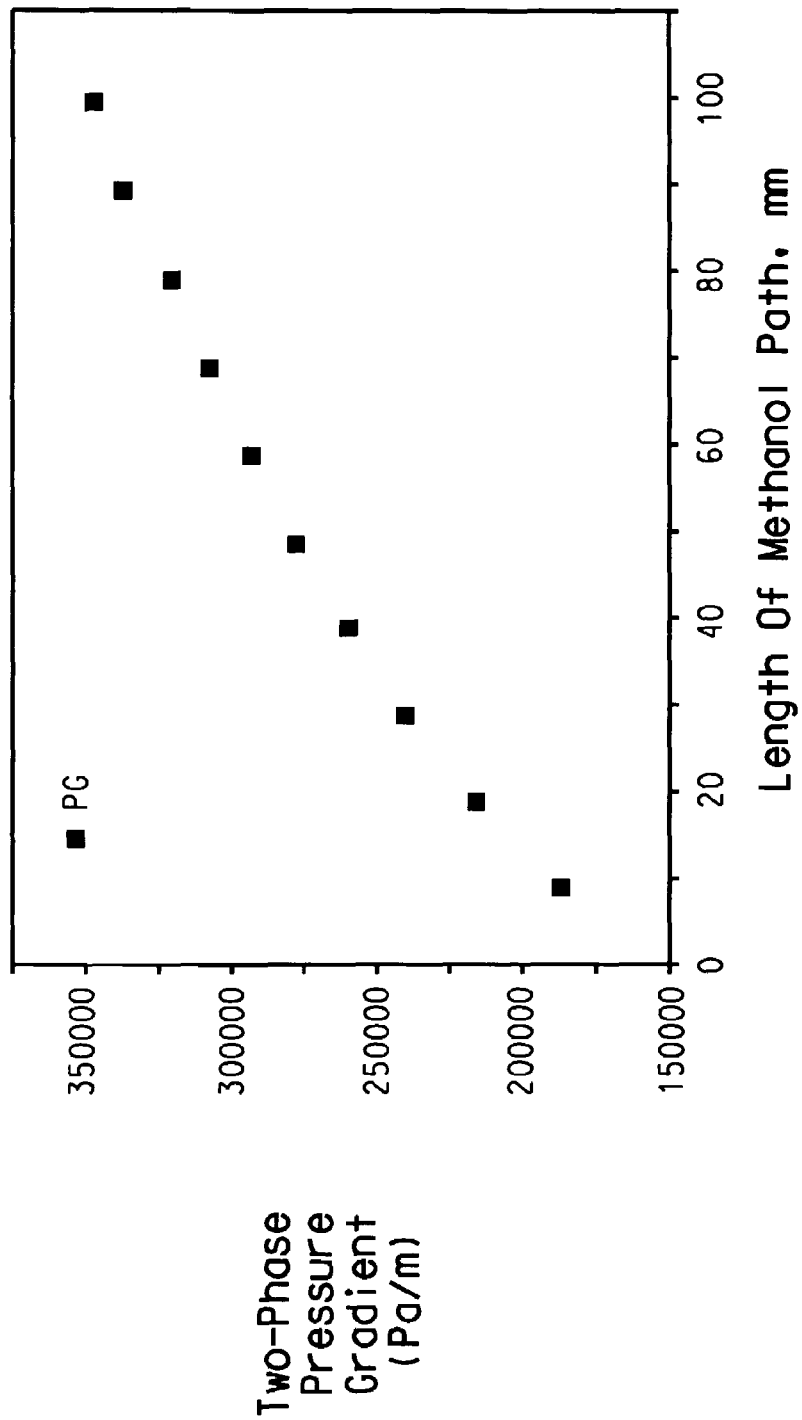
FIG. 4 illustrates two-phase pressure gradient (liquid methanol and $CO_2$ gas) for the flow field of FIG. 2.

FIGS. 3 and 4 illustrate the theoretical (empirical) pressure drop and pressure gradient in a typical flow field of the present invention. In both cases, two-phase flow was assumed, namely liquid methanol as fuel and carbon dioxide as by-product.

The flow field design of the present invention, therefore, has been found to be effective for transporting the liquid fuel or gaseous oxidant during operation of the fuel cell. The present invention provides:

Optimum pressure drop inside cell, that is, it provides an optimum balance between pressure drop and performance of the fuel cell Uniform pressure drop within the fuel cell Minimal stagnant areas in the cell Enhanced fuel distribution across the plate with minimal pressure drop Enhanced by-product removal Improved fuel cell performance, that is, better system performance, as compared with prior art systems The present invention provides new flow-field designs comprising a network of interconnected channels and orifices defined by a plurality of staggered lands. The channels are generally linear and arranged diagonal to one another while the orifices are arranged in a staggered fashion. The channels are interconnected to one another in flow communication via traverse/longitudinal channels.

The flow field design is based on the formation of multiple orifices and channels that reduce the pressure drop to keep the fluid constantly flowing via a push-pull mechanism and prevent the formation of gas bubbles that could upset the flow of material. The channels are arranged in a diagonal configuration to ensure homogeneous distribution of the fuel and oxidant and reduce the probability of formation of stagnant areas in the flow field. The preferable designs that satisfy most of the above requirements include, but are not limited to, the diamond and honeycomb designs shown in FIG. 1. Other designs that may be used include octagonal or other polygonal structures that combine orifices and diagonal channels.

Although the present invention has been shown and described with respect to its preferred embodiments, it will be understood by those skilled in the art that other changes, modifications, additions and omissions may be made without departing from the substance and the scope of the present invention as defined by the attached claims.

What is claimed is:

1. A flow field plate for use in a proton exchange membrane fuel cell for delivering fuel or oxidant to and for removing reaction by-products from a side of the proton exchange membrane, the flow field plate being made of an electrically conducting material and comprising:
   (a) a substantially planar surface;
   (b) a flow field formed in the substantially planar surface;
   (c) a fluid supply manifold through which a fuel or an oxidant is introduced to the flow field and a fluid exhaust manifold through which reaction by-products and excess fuel or oxidant are removed from the flow field, wherein the fuel or oxidant and reaction by-products migrate through the flow field in a fluid migration direction oriented from the fluid supply manifold toward the fluid exhaust manifold;
   (d) a plurality of spaced lands in the flow field, said lands being arranged in rows that are substantially perpendicular to the fluid migration direction, the lands in each row being staggered from the lands of the adjacent row so as to define a network of channels in the flow field, said channels being oriented diagonal to the fluid migration direction, each of said channels intersecting other channels of the network of channels where each channel crosses a row of lands, each intersection of channels occurring at an orifice in the flow field formed between a plurality of lands;
whereby streams of fuel or oxidant and reaction by-products are continually separated and diverted into separate channels by the lands as the streams pass each row of lands in the flow field, and the separated streams are then mixed with streams from adjacent channels.

2. The flow field plate of claim 1 in which the lands are hexagonal in shape.

3. The flow field plate of claim 1 in which the lands are diagonal in shape.

4. The flow field plate of claim 1 in which the channels are substantially equal in size.

5. A fuel cell assembly comprising:
   (a) an anode;
   (b) a cathode;
   (c) a solid polymer electrolyte disposed between the anode and cathode; and
   (d) a pair of opposing flow field plates made of a electrically conducting material and comprising:
      (i) a substantially planar surface;
      (ii) a flow field formed in the substantially planar surface;
      (iii) a fluid supply manifold through which a fuel or an oxidant is introduced to the flow field and a fluid exhaust manifold through which reaction by-products and excess fuel or oxidant are removed from the flow field, wherein the fuel or oxidant and reaction by-products migrate through the flow field in a fluid migration direction oriented from the fluid supply manifold toward the fluid exhaust manifold;
      (iv) a plurality of spaced lands in the flow field, said lands being arranged in rows that are substantially perpendicular to the fluid migration direction, the lands in each row being staggered from the lands of the adjacent row so as to define a network of channels in the flow field, said channels being oriented diagonal to the fluid migration direction, each of said channels intersecting other channels of the network of channels where each channel crosses a row of lands, each intersection of channels occurring at an orifice in the flow field formed between a plurality of lands;
whereby streams of fuel or oxidant and reaction by-products are continually separated and diverted into separate channels by the lands as the streams pass each row of lands in the flow field, and the separated streams are then mixed with streams from adjacent channels.

6. The fuel cell assembly of claim 5 in which the lands are hexagonal in shape.

7. The fuel cell assembly of claim 5 in which the lands are diagonal in shape.

8. The fuel cell assembly of claim 5 in which the channels are substantially equal in size.

* * * * *

UNITED STATES PATENT AND TRADEMARK OFFICE
CERTIFICATE OF CORRECTION

PATENT NO.       : 7,097,931 B2                                        Page 1 of 1
APPLICATION NO.  : 10/250563
DATED            : August 29, 2006
INVENTOR(S)      : Abdou Mohamed et al.

It is certified that error appears in the above-identified patent and that said Letters Patent is hereby corrected as shown below:

Title Page
Item [75], Inventors: Add -- Yuqi Cai, Kingston (CA) --

Signed and Sealed this

Seventh Day of November, 2006

JON W. DUDAS
*Director of the United States Patent and Trademark Office*